March 18, 1958 C. L. ANDERSON 2,827,507

SHIELDING DEVICE AND STRUCTURE THEREOF

Filed April 30, 1953

INVENTOR
CARL L. ANDERSON
BY Elmer J. Gorn
ATTORNEY 2,827,507

SHIELDING DEVICE AND STRUCTURE THEREOF

Carl L. Anderson, Waltham, Mass., assignor to Raytheon Manufacturing Company, Newton, Mass., a corporation of Delaware Application April 30, 1953, Serial No. 352,121

4 Claims. (Cl. 174—35)

This invention relates to a shielding device used to protect electrical components or circuits from external and internal influences.

It is well known that a metal shield may be placed around a circuit to prevent interaction of its electric and magnetic fields with those of nearby parts. Such shielding devices are frequently used to prevent magnetic coupling at radio frequencies. For example, the stages of an intermediate frequency amplifier in a microwave receiver are quite sensitive to external and internal electrical fields. Therefore, the circuit components of these stages are shielded with a metal container which surrounds these components. However, if leaks occur in such a shielded amplifier circuit, troubles due to interference and feedback may result. Therefore, it is very important that the metal container surrounding the electrical components be grounded along its entire length to prevent such leaks.

This invention involves the use of a metal shielding device or container which maintains a high shielding efficiency, provides excellent grounding along its entire length, is low in cost and is readily adapted to high-speed manufacturing techniques. The electrical components to be shielded are mounted on a flat metal panel between two V-shaped grooves which have been pressed into the panel. These grooves lie close to opposed edges of the panel and extend along the length of the panel. When the components are properly mounted, a metal shielding cover is placed over them. The cover is designed so that the edges thereof wedge into the grooves of the panel when the cover is tightened down. Thus, the grounding obtained along these wedged edges and throughout the shielding device is excellent and the effects of external electrical fields may easily be obviated.

This invention and the features thereof will be understood more clearly and fully from the following detailed description of one embodiment of the invention with reference to the accompanying drawings wherein.

Figure 1:
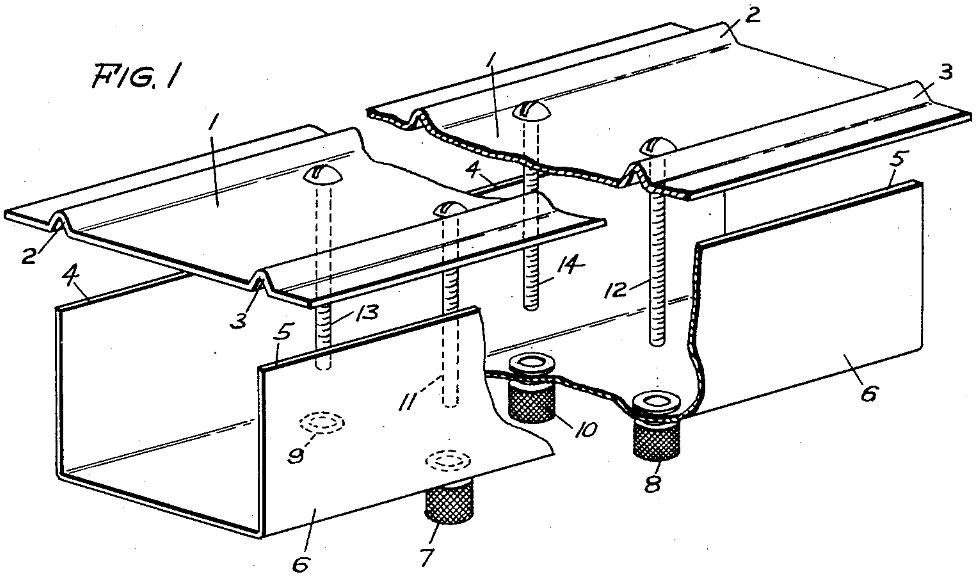
Fig. 1 is an exploded view of the shielding panel and cover and the threaded studs and captured nuts used to hold the cover and the panel together.
Figures 2, 3:
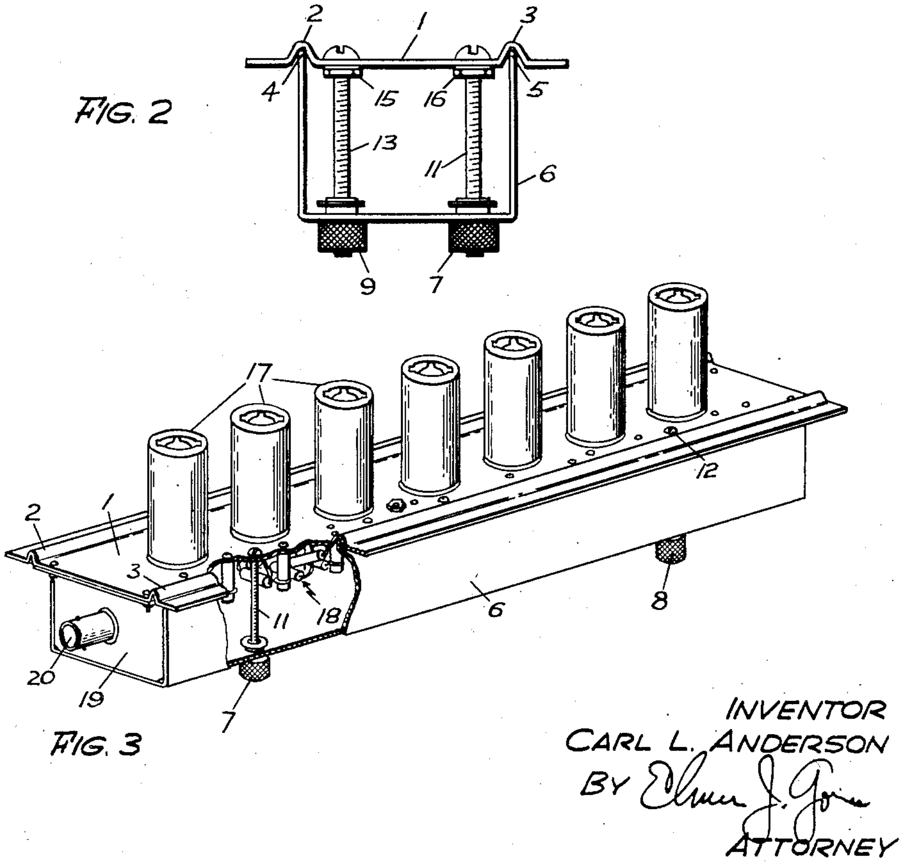
Fig. 2 is an end view of the members shown in Fig. 1 as they appear when assembled.
Fig. 3 is an isometric view of the shielding device as used to protect an amplifier strip, for example.

Referring now to Figs. 1 and 2, a flat rectangular metal panel 1 is used as a platform on which a group of electrical components, not shown, may be connected and thereafter shielded. The panel should be made of a low resistance material to obtain proper shielding, and for the purposes of this invention aluminum has been used successfully. Panel 1 has two parallel grooves 2 and 3 impressed thereon which extend throughout the length of the panel. These grooves may be stamp pressed into the panel 1 but care should be taken to keep the panel flat and straight. The grooves 2 and 3 are substantially V-shaped in cross-section, and should be designed so that the bottom of the grooves are narrower than the width of the edges 4 and 5 of the cover 6. Also, the surface or outer width of the grooves should be greater than the width of the edges 4 and 5 so that these edges may readily fit into the grooves 2 and 3. Thus, when the edges 4 and 5 are fitted into the grooves and the cover 6 is tightened into position, the edges wedge into the grooves, thereby giving an excellent grounding along the entire length of the panel 1. In Fig. 1, the panel 1 and cover 6 are broken away through center sections thereof to show that the lengths of these members are not critical and are only limited by the size and number of components which they shield. Likewise, the width of the panel 1 and the cover 6 may be increased or decreased as desired so long as the edges 4 and 5 of the cover are made to conform with the width of the grooves 2 and 3, as previously described.

The cover 6 should also be made of a low resistance material and may be substantially U-shaped or trough shaped in cross-section as shown in Figs. 1 and 2; for example, a stainless steel cover has been used successfully for this purpose. The walls of the cover 6 should be made thin enough to be somewhat flexible, thereby insuring that the edges 4 and 5 will fit easily into the grooves 2 and 3. The edges 4 and 5 of this cover should be straight so they will lie evenly along the inner faces of the grooves 4 and 5 when placed therein. The cover 6 is provided with a set of four captured nuts 7, 8, 9 and 10 which, when threaded onto a set of fixed studs 11, 12, 13 and 14 extending through the panel, enable the cover to be tightened down. The studs may be secured to the panel 1 by another set of nuts not shown in Fig. 1; two of these nuts 15 and 16 may be seen in Fig. 2 supporting the studs 11 and 12, respectively. Thus, the captured nuts 7, 8, 9 and 10 may be threaded onto the opposed studs until the edges 4 and 5 are properly wedged into the grooves 2 and 3 to join the basic members of the shielding device.

Fig. 3 shows a completed assembly shielded in accordance with this invention. A set of shielded tubes 17, such as might be used in an intermediate frequency amplifier strip, for example, are mounted in one of each of the group of holes provided in the panel 1 for this purpose. The internal electrical components 18, shown in the broken-away section of Fig. 3, are connected to their respective tubes and are shielded by enclosing them with the cover 6 as previously described. A captured nut 7 and a stud 11 are shown for purposes of illustrating the means by which the cover 6 and the panel 1 are held together. Whereas four sets of studs and nuts are needed to properly tighten the cover of the assembly shown in Fig. 3, more may be necessary to insure proper grounding along the grooves 2 and 3 if the length of the panel is increased. A flanged end plate, such as the end plate 19 shown in Fig. 3, is connected to each end of the panel 1 by suitable means so as to shield the otherwise open ends of the cover 6. The plate 19 may be provided with a plug 20, or other suitable means, whereby external connections may be made as desired to the shielded components 18. Thus, these components may be completely shielded from external electrical effects.

It should be noted that the shielding assembly described is readily adaptable to high speed manufacturing techniques and the parts used in the assembly are relatively inexpensive in comparison to those previously employed within the art. The holes in the panel 1, through which the several tubes 17 and the studs 11, 12, 13 and 14 extend, may readily be punched into the panel before the grooves 2 and 3 are impressed thereon. Thus, expensive drilling operations which are used to produce conventional shielding containers are eliminated. Likewise, the electrical components 18 may be easily connected to the tube sockets which extend through the flat mounting panel 1, and the panel itself decreases the difficulties of working in tight spaces.

However, it should be understood that this invention is not limited to the particular details described above, as many equivalents will suggest themselves to those skilled in the art. For example, the grooves 2 and 3 might be U-shaped rather than V-shaped, and the cross-section of the cover 6 might be semicircular as well. Also, the shielding device could take the shape of a cube rather than the elongated rectangular form shown. Likewise, the end plates can be made as a part of the panel 1 instead of being separately attached thereto. Furthermore, any suitable means may replace the stud and nuts used to connect the panel and the cover. Therefore, it is desired that the appended claims be given a broad interpretation commensurate with the scope of the invention within the art.

What is claimed is:

1. A shielding device comprising a relatively thin, flexible sheet metal panel adapted to support a first group of electrical components on the top surface thereof and a second group of electrical components on the under-surface thereof, said panel having a pair of depressions in the under-surface thereof such that a portion of the material of said panel is thereby forced upward to form a pair of V-shaped grooves in the under-surface and corresponding V-shaped ridges on the top surface thereof, a trough-shaped metal cover of relatively thin, flexible sheet material the edges of which are in physical line contact with the inner faces of said grooves whereby accurate electrical contact between said cover and said panel is achieved, said edges having a width which is larger than the width of the bottom of said grooves but smaller than the outer width of said grooves, means for removably wedging said edges into said grooves in order to effectively achieve said electrical contact, and means for enclosing the ends of said cover.

2. A shielding device comprising a relatively thin, flexible sheet metal mounting panel, said panel having a pair of depressions in the under-surface thereof such that a portion of the material of said panel is thereby forced upward to form a pair of V-shaped grooves in the under-surface and corresponding V-shaped ridges on the top surface thereof, a first group of electrical components connected to the top surface of said panel, a second group of electrical components connected to the under surface of said panel, said second group of components being sensitive to internally and externally induced electrical interferences, a trough-shaped metal cover of relatively thin, flexible sheet material the edges of which are in physical line contact with the inner faces of said grooves whereby accurate electrical contact between said cover and said panel is achieved, said edges having a width which is larger than the width of the bottom of said grooves but smaller than the outer width of said grooves, means for removably wedging said edges into said grooves in order to effectively achieve said electrical contact, and means for enclosing the ends of said cover.

3. A shielding device comprising a flat, relatively thin, flexible sheet metal mounting panel, said panel having a spaced pair of parallel depressions in the under-surface thereof such that a portion of the material of said panel is thereby forced upward to form a spaced pair of parallel V-shaped grooves along the length of the under-surface and corresponding V-shaped ridges along the length of the top surface thereof, a first group of electrical components connected to the top surface of said panel, a second group of electrical components connected to the under surface of said panel, intermediate said grooves, said second group of components being sensitive to internally and externally induced electrical interferences, a trough-shaped metal cover of relatively thin, flexing sheet material the edges of which are in physical line contact with the inner faces of said grooves whereby accurate electrical contact between said cover and said panel is achieved, said edges having a width which is larger than the width of the bottom of said grooves but smaller than the outer width of said grooves, means for removably wedging said edges into said grooves in order to effectively achieve said electrical contact, and means for enclosing the ends of said cover.

4. A shielding device comprising a flat, relatively thin, flexible sheet metal mounting panel, said panel having a spaced pair of parallel depressions in the under-surface thereof such that a portion of the material of said panel is thereby forced upward to form a spaced pair of parallel V-shaped grooves along the length of the under-surface and corresponding V-shaped ridges along the length of the top surface thereof, a first group of electrical components connected to the top surface of said panel, a second group of electrical components connected to the under surface of said panel, intermediate said grooves, said second group of components being sensitive to internally and externally induced electrical interferences, a U-shaped metal cover of relatively thin, flexible sheet material the edges of which are in physical line contact with the inner faces of said grooves whereby accurate electrical contact between said cover and said panel is achieved, said edges having a width which is larger than the width of the bottom of said grooves but smaller than the outer width of said grooves, a set of captured nuts in said cover threaded onto a set of fixed studs in said panel for removably wedging said edges into said grooves in order to effectively achieve said electrical contact, and a pair of metal flanges each attached to an end of said panel to enclose the ends of said cover.

References Cited in the file of this patent

UNITED STATES PATENTS

| | | |
|---|---|---|
| 531,005 | Priestly | Dec. 18, 1894 |
| 1,009,654 | Drucker | Nov. 21, 1911 |
| 1,816,718 | Bond | July 28, 1931 |
| 1,817,034 | Hotchkin | Aug. 4, 1931 |
| 2,448,711 | Hallett | Sept. 7, 1948 |
| 2,481,806 | Wolfskill | Sept. 13, 1949 |
| 2,604,507 | Tyson | July 22, 1952 |
| 2,638,261 | Poole | May 12, 1953 |
| 2,661,447 | Hall | Dec. 1, 1953 |
| 2,722,599 | Himes | Nov. 1, 1955 |

FOREIGN PATENTS

| | | |
|---|---|---|
| 30,377/30 | Australia | Mar. 26, 1931 |